(12) United States Patent
Reis

(10) Patent No.: US 7,608,785 B2
(45) Date of Patent: Oct. 27, 2009

(54) SYSTEM FOR TRANSMITTING CURRENT INCLUDING MAGNETICALLY DECOUPLED SUPERCONDUCTING CONDUCTORS

(75) Inventor: Chandra Reis, Altamont, NY (US)

(73) Assignee: SuperPower, Inc., Schenectady, NY (US)

( * ) Notice: Subject to any disclaimer, the term of this patent is extended or adjusted under 35 U.S.C. 154(b) by 800 days.

(21) Appl. No.: 10/832,923

(22) Filed: Apr. 27, 2004

(65) Prior Publication Data

US 2005/0236175 A1      Oct. 27, 2005

(51) Int. Cl.
*H01B 12/00* (2006.01)
*H01L 39/24* (2006.01)

(52) U.S. Cl. ............... 174/125.1; 505/230; 505/430; 29/599

(58) Field of Classification Search .......... 174/125.1, 174/15.4, 15.5; 505/230–232; 29/599
See application file for complete search history.

(56) References Cited

U.S. PATENT DOCUMENTS

| | | | |
|---|---|---|---|
| 3,152,033 A | 10/1964 | Black | |
| 3,306,972 A | 2/1967 | Laverick et al. | |
| 3,502,783 A | 3/1970 | Aupoix et al. | |
| 3,730,966 A | 5/1973 | Aupoix et al. | |
| 3,749,811 A | 7/1973 | Bogner et al. | |
| 4,020,274 A | 4/1977 | Dean | |
| 4,020,275 A | 4/1977 | Dean | |
| 4,176,238 A | 11/1979 | Vulis et al. | |
| 4,617,789 A | 10/1986 | Borden | |
| 4,947,007 A | 8/1990 | Dew et al. | |
| 4,947,637 A | 8/1990 | Royet et al. | |
| 4,956,336 A | 9/1990 | Salama et al. | |
| 5,057,489 A | 10/1991 | Ohkawa et al. | |
| 5,244,874 A | 9/1993 | Yamamoto et al. | |
| 5,306,697 A | 4/1994 | Salama et al. | |
| 5,374,320 A | 12/1994 | Matsumoto et al. | |
| 5,381,666 A | 1/1995 | Saho et al. | |
| 5,439,879 A | 8/1995 | Salama et al. | |
| 5,462,917 A | 10/1995 | Salama et al. | |
| 5,508,106 A | 4/1996 | Yoshino | |
| 5,670,860 A | 9/1997 | Conrady et al. | |
| 5,798,154 A | 8/1998 | Bryan | |

(Continued)

FOREIGN PATENT DOCUMENTS

CA      2439947      5/2003

(Continued)

OTHER PUBLICATIONS

P.A. Klaudy & J. Gerhold, Practical Conclusions from Field Trials of a Superconducting Cable, IEEE Transactions on Magnetics, article, vol. MAG-19, No. 3, pp. 656-661, May 1983.

(Continued)

*Primary Examiner*—Jeremy C Norris
(74) *Attorney, Agent, or Firm*—Larson Newman & Abel, LLP (57) ABSTRACT

A system for transmitting current is described. The system includes at least one generator, at least one cryostat, and at least one load. The system may further include one of terminations, a refrigeration system, and terminations and a refrigeration system. The cryostat has at least one electrical phase including at least one mandrel and magnetically decoupled superconducting conductors that may accomplished by, for example, braiding the superconductor.

81 Claims, 4 Drawing Sheets

U.S. PATENT DOCUMENTS

| | | | |
|---|---|---|---|
| 5,846,912 | A | 12/1998 | Selvamanickam et al. |
| 5,929,385 | A | 7/1999 | Sugimoto et al. |
| 6,005,194 | A | 12/1999 | Ries |
| 6,049,036 | A | 4/2000 | Metra |
| 6,107,905 | A | 8/2000 | Itoh et al. |
| 6,158,106 | A | 12/2000 | Ohkura et al. |
| 6,172,009 | B1 | 1/2001 | Smith et al. |
| 6,194,352 | B1 | 2/2001 | Riley, Jr. et al. |
| 6,199,266 | B1 | 3/2001 | Meserve |
| 6,255,595 | B1 | 7/2001 | Metra et al. |
| 6,262,375 | B1 | 7/2001 | Engelhardt et al. |
| 6,271,474 | B1 | 8/2001 | Fujikami et al. |
| 6,342,673 | B1 | 1/2002 | Verhaege et al. |
| 6,397,454 | B1 | 6/2002 | Seuntjens et al. |
| 6,417,458 | B1 | 7/2002 | Mukoyama et al. |
| 6,438,969 | B1 | 8/2002 | Laskaris et al. |
| 6,448,501 | B1 | 9/2002 | McIntyre et al. |
| 6,453,677 | B1 | 9/2002 | Arman |
| 6,512,311 | B1 | 1/2003 | Metra et al. |
| 6,525,265 | B1 | 2/2003 | Leijon et al. |
| 6,552,260 | B2 | 4/2003 | Fujikami et al. |
| 6,553,773 | B2 | 4/2003 | Laskaris |
| 6,558,172 | B2 | 5/2003 | Kanagawa |
| 6,561,412 | B2 | 5/2003 | Maeda et al. |
| 6,571,453 | B1 | 6/2003 | Kautz et al. |
| 6,576,843 | B1 | 6/2003 | Ashworth |
| 6,583,351 | B1 | 6/2003 | Artman |
| 6,584,334 | B2 | 6/2003 | Pereira et al. |
| 6,586,370 | B1 | 7/2003 | Holcomb |
| 6,596,421 | B2 | 7/2003 | Schmidt et al. |
| 6,596,945 | B1 | 7/2003 | Hughey et al. |
| 6,603,379 | B1 | 8/2003 | Manlief et al. |
| 6,604,273 | B1 | 8/2003 | Kaneko |
| 6,631,280 | B1 | 10/2003 | Otabe et al. |
| 6,633,003 | B2 | 10/2003 | Nassi et al. |
| 6,635,603 | B1 | 10/2003 | Batlogg et al. |
| 6,638,894 | B1 | 10/2003 | Batlogg et al. |
| 6,640,552 | B1 | 11/2003 | Rampersad et al. |
| 6,642,182 | B2 | 11/2003 | Kaneko |
| 6,675,623 | B2 | 1/2004 | Wada et al. |
| 6,684,486 | B1 | 2/2004 | Willen |
| 6,743,984 | B2 * | 6/2004 | Nassi et al. ............... 174/125.1 |
| 6,936,772 | B2 * | 8/2005 | Hughey et al. ........... 174/125.1 |
| 7,238,887 | B2 * | 7/2007 | Hirose ..................... 174/125.1 |
| 2002/0019315 | A1 | 2/2002 | Nassi et al. |
| 2002/0032125 | A1 * | 3/2002 | Celik et al. ................. 505/230 |
| 2002/0038719 | A1 | 4/2002 | Nassi et al. |
| 2002/0076567 | A1 | 6/2002 | Honjo et al. |
| 2002/0134533 | A1 | 9/2002 | Bechis et al. |
| 2002/0134574 | A1 | 9/2002 | Hughey et al. |
| 2002/0142918 | A1 | 10/2002 | Riley, Jr. et al. |
| 2002/0170733 | A1 | 11/2002 | Rasmussen |
| 2002/0198111 | A1 * | 12/2002 | Tomsic ....................... 505/230 |
| 2003/0000731 | A1 | 1/2003 | Hughey et al. |
| 2003/0010527 | A1 | 1/2003 | Metra et al. |
| 2003/0019660 | A1 | 1/2003 | Spreafico |
| 2003/0024730 | A1 | 2/2003 | Otto et al. |
| 2003/0029629 | A1 | 2/2003 | Spreafico et al. |
| 2003/0032560 | A1 | 2/2003 | Otto et al. |
| 2003/0040439 | A1 | 2/2003 | Castiglioni et al. |
| 2003/0079343 | A1 | 5/2003 | McAninch et al. |
| 2003/0127492 | A1 | 7/2003 | Ayai et al. |
| 2003/0130128 | A1 | 7/2003 | Han |
| 2003/0148891 | A1 | 8/2003 | Iida et al. |
| 2003/0159847 | A1 | 8/2003 | Adrian et al. |
| 2003/0164246 | A1 | 9/2003 | Nassi et al. |
| 2003/0184929 | A1 | 10/2003 | Miura et al. |
| 2003/0207767 | A1 | 11/2003 | Kim et al. |
| 2004/0000421 | A1 | 1/2004 | Reis et al. |
| 2004/0058822 | A1 | 3/2004 | Ohmatsu |
| 2004/0069526 | A1 | 4/2004 | Darmann et al. |
| 2004/0102329 | A1 | 5/2004 | Mele |
| 2004/0138066 | A1 | 7/2004 | Sinha et al. |
| 2004/0211586 | A1 | 10/2004 | Sinha et al. |

FOREIGN PATENT DOCUMENTS

| | | |
|---|---|---|
| EP | 0308326 B1 | 3/1989 |
| EP | 1018748 A1 | 7/2000 |
| GB | 1130464 | 10/1968 |
| GB | 1 387 860 | 3/1975 |
| GB | 2350474 A | 11/2000 |
| JP | 10125150 | 5/1998 |
| JP | 11066979 | 3/1999 |
| JP | 11073824 | 3/1999 |
| JP | 2000/090998 | 3/2000 |
| JP | 2001/006455 | 1/2001 |
| JP | 2001/035272 | 2/2001 |
| JP | 2001/229750 | 8/2001 |
| JP | 2001/283653 | 10/2001 |
| JP | 2003/187651 | 7/2003 |
| JP | 2003/242842 | 8/2003 |
| WO | WO 98/13859 | 4/1998 |
| WO | WO 99/48115 | 9/1999 |
| WO | WO 00/39811 | 7/2000 |
| WO | WO 01/33578 A1 | 5/2001 |
| WO | WO 02/15203 A1 | 2/2002 |
| WO | WO 03/012460 A2 | 2/2003 |
| WO | WO 03/034447 A1 | 4/2003 |
| WO | 03/052774 A1 | 6/2003 |
| WO | WO 03/065383 A2 | 8/2003 |
| WO | WO 03/085682 | 10/2003 |
| WO | WO 03/103094 A1 | 12/2003 |

OTHER PUBLICATIONS

E.B. Forsyth, Superconducting Power Transmission Systems-The Past and Possibly the Future, Supercond. Sci. Technology vol. 6, pp. 699-714, IOP Publishing Ltd., 1993.

International Search Report mailed on Sep. 6, 2005 in connection with PCT/US2005/009563.

Written Opinion of the International Searching Authority mailed on Sep. 6, 2005 in connection with PCT/US2005/009563.

S.H. Pan, E.W. Hudson, J.Ma, and J.C. Davis, Imaging and Identification of Atomic Planes of Cleaved Bi2 Sr2 CaCu2 O8+s by High Resolution Scanning Tunneling Microscopy, vol. 73-1, 1998, p. 58-60, American Institute of Physics.

Ecole Polytechnique Federale De Lausanne, Super Conductive HTSC & BSCCO 2223 Tapes, vol. 1, pp. 1-9, 1998, website, http://lanoswww.epfl.ch/studinfo/courses/cours_ supra/BI2223/Default.htm.

Energetics, Inc., Coated Conductor Technology Development Roadmap, report, p. 1-41, 2001, U.S. Department of Energy.

American Superconductor, Bi-2223 High Current Density Wire, fact sheet, p. 1-2, 1999, American Superconductor Two Technology Drive, Westborough, MA 01581.

A.P. Malozemoff, D.T. Verebelyi, S. Fleshler, D. Aized, D. Yu, HTS Wire: Status and Prospects, article, p. 1-9, PL-2/SPA2002, 2002, American Superconductor Two Technology Drive, Westborough, MA 01581.

* cited by examiner

SYSTEM FOR TRANSMITTING CURRENT INCLUDING MAGNETICALLY DECOUPLED SUPERCONDUCTING CONDUCTORS

The present invention relates generally to a system for transmitting current and magnetically decoupled superconducting conductors for carrying at least one electrical phase of the system.

BACKGROUND

In the past three decades, electricity has risen from 25% to 40% of end-use energy consumption in the United States. With this rising demand for power comes an increasingly critical requirement for highly reliable, high quality power. As power demands continue to grow, older urban electric power systems in particular are being pushed to the limit of performance, requiring new solutions.

Metal conductors, such as copper and aluminum, form a foundation of the world's electric power system, including generators, transmission and distribution systems, transformers, and motors. The discovery of high-temperature superconducting (HTS) compounds has led to an effort to develop conductors incorporating these compounds for the power industry to replace metal conductors. HTS conductors are one of the most fundamental advances in electric power system technology in more than a century.

HTS conductors carry over one hundred times more current than do conventional metal conductors of the same physical dimension. The superior power density of HTS conductors will enable a new generation of power industry technologies. HTS conductors offer major size, weight, efficiency, and environmental benefits.

HTS technologies will drive down costs and increase the capacity and reliability of electric power systems in a variety of ways. For example, an electrical cable consisting of HTS conductors is capable of transmitting two to five times more power through existing rights of way, thus improving the performance of power grids while reducing their environmental footprint.

One way to characterize HTS conductors is by their cost per meter. An alternative way to characterize HTS conductors is by cost per kiloamp-meter. For example, by increasing the current carrying capacity for a given cost per meter of HTS conductor, the cost per kiloamp-meter is reduced. The maximum current carrying capacity is called the critical current.

Among the several issues that need to be resolved for HTS conductors to be used effectively in power transmission is AC losses. The typical approaches to reducing the AC losses in a cable incorporating HTS conductors has relied on creating nearly monolithic annuli of HTS conductors. For example, the surface of a structure supporting the HTS conductors to create the annuli is nearly completely covered with HTS conductors. However, as the HTS conductors improve in current carrying capacity, there is often more conductor used to cover the surface than is necessary to carry the current. However, often in these types of designs, reducing the amount of HTS conductors only increases AC losses.

Thus, there remains a need for a new and improved cable winding configuration that is capable of use in a system for transmitting current by taking advantage of improvements being made in superconductor conductors, while at the same time including acceptable and even improved properties with regard to AC losses.

SUMMARY

The present invention is directed to a system for transmitting current. The system includes a generator, a superconducting cable, and at least one load. Further, the system may include one of terminations, a refrigeration system, and terminations and a refrigeration system. The cable has at least one electrical phase including a mandrel and at least one band of magnetically decoupled superconducting conductors.

The mandrel may be a flexible material. For example, single-filament or multiple-filament (e.g., plurality of filaments) alloys, such as one of an aluminum alloy and a copper alloy, may be used as a mandrel. No matter the construction or the material, it is advantageous that the mandrel be cryogenically compatible.

A purpose of the magnetically decoupled superconducting conductors is to reduce AC losses.

In addition to the at least one electrical phase including at least one mandrel and braided magnetically decoupled superconducting conductors, the cable may also include one or more of thermal insulation, a protective jacket, electrically insulating material (dielectric), an electrostatic shield, a fault winding, and a cryogen path.

Certainly, the cable includes at least one electrical phase and may include a plurality of electrical phases. The plurality may be three, and at least two of the plurality of electrical phases include a mandrel and braided magnetically decoupled superconducting conductors.

Accordingly, one aspect of the present invention is to provide a system for transmitting current. The system includes at least one generator, at least one cryostat, and at least one load. The at least one generator generates at least one phase of electrical power. The at least one cryostat has at least one electrical phase including at least one mandrel and magnetically decoupled superconducting conductors. The generator and load can be assumed to represent equivalent simplifications of the electrical grid, and can be electrically interchanged.

Another aspect of the present invention is to provide a superconducting cable useable in a system for transmitting current, such as the one mentioned above. The cable has at least one cryostat containing at least one electrical phase that includes a mandrel and braided magnetically decoupled superconducting conductors.

Still another aspect of the present invention is to provide a system for transmitting current. The system includes at least one generator, at least one superconducting cable, at least one load, and one of terminations, at least one refrigeration system, and terminations and at least one refrigeration system. The at least one generator generates at least one phase of electrical power. The at least one cable has at least one cryostat containing at least one electrical phase including at least one mandrel and braided magnetically decoupled superconducting conductors.

These and other aspects of the present invention will become apparent to those skilled in the art after a reading of the following description of the preferred embodiment when considered with the drawings.

DETAILED DESCRIPTION

In the following description, like reference characters designate like or corresponding parts throughout the several views shown in the figures. It is also understood that terms such as "top," "bottom," "outward," "inward," and the like are words of convenience and are not to be construed as limiting terms.

Figure 1:
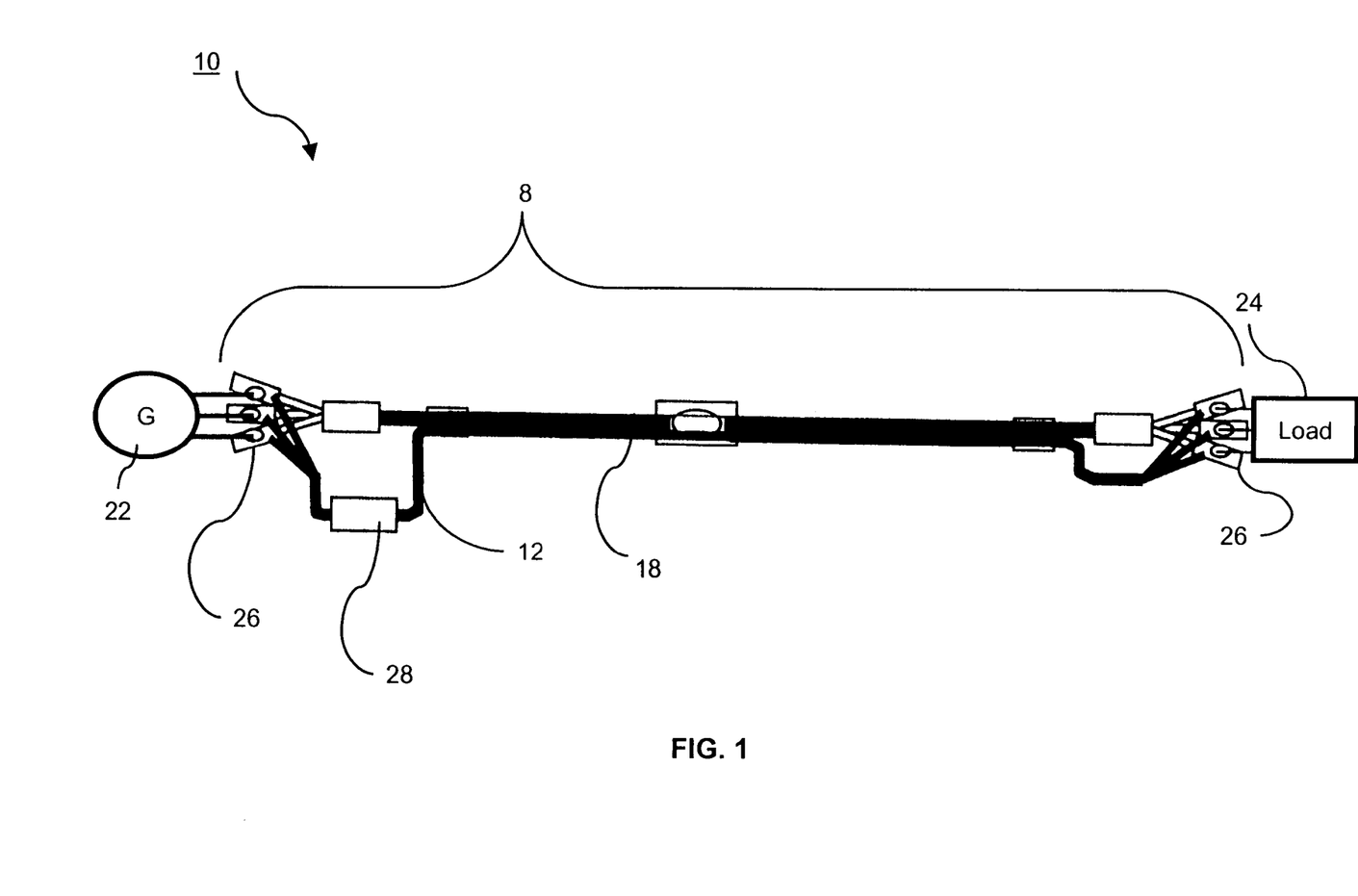
FIG. 1 is a schematic illustrating a system for transmitting current constructed according to the present invention.

Referring to the drawings in general and to FIG. 1 in particular, it will be understood that the illustrations are for the purpose of describing a preferred embodiment of the invention and are not intended to limit the invention thereto. FIG. 1 shows a system 10 for transmitting current. The system 10 includes at least one of the following: generator 22, cable 8 containing at least one cryostat 12, load 24, terminations 26 and refrigeration system 28. The system 10 may include at least one splice 18. The at least one generator 22 may generate one, preferably three, phase electrical power. As may be seen in FIG. 2, the at least one cable 8 has at least one cryostat 12 containing at least one electrical phase 14. FIG. 3 shows the electrical phase 14 including at least one mandrel 16 and braided magnetically decoupled superconducting conductors 20.

The generator 22 and the load 24 and the system 10 are any of those known in the art. The generator 22 and the load 24 may each also be seen as representing an entire grid of conductors, cables, busses, loads, transformers, generators, etc. as is known in the art.

The refrigeration system 28 is sized so as to maintain any superconducting conductors within the cable 8 at a temperature below the critical temperature. The refrigeration system 28 also has to provide a method to transfer the heat from the cable 8 to the refrigeration system 28. The refrigeration system 28 may be a refrigerator and includes a mechanism for circulating cryogen through the cable 8. One example is to continuously circulate a cryogenic fluid through the cable 8 to collect the heat, and through the refrigeration system 28 to remove the heat. Examples of a refrigeration system 28 may be any such as is known in the art.

Examples of terminations 26 may be any such as of those disclosed in any one of U.S. Pat. No. 6,525,265, "High Voltage Power Cable Termination," issued Feb. 25, 2003, to Leijon et al.; PCT Pat. Appln. No. PCT/US02/31382, "Superconducting Cable Termination," filed Oct. 2, 2002 for Southwire Company et al.; European Patent No. EP 1151442, "Electrical Power Transmission System Using Superconductors," filed Dec. 22, 1999 for Pirelli Cavi E Sistemi S.P.A. et al.; World Patent No. WO03103094, "Current Lead for Superconducting Apparatus," filed May 31, 2002 for Pirelli & C.S.P.A. et al.; JP Patent No. 11073824, "Superconducting Cable Terminating Part," published Mar. 16, 1999 for Tokyo Electric Power Co., Inc. et al.; U.S. Patent Publication No. U.S. 2003/0040439 A1, "Termination of the Conductor of a Superconducting Cable," published on Feb. 27, 2003, for Castiglioni et al.; and U.S. Pat. No. 6,049,036, "Terminal For Connecting A Superconducting Multiphase Cable to a Room Temperature Electrical Equipment," issued Apr. 11, 2000, to Metra, the entire disclosure of each being incorporated by reference herein.

The splice 18 may be any of the type that permits the joining of superconducting conductors of varying lengths to create a greater length. A splice 18 may join shorter lengths of magnetically decoupled superconducting conductors 20 to create a greater length of magnetically decoupled superconducting conductors 20. Alternatively, a splice 18 may join a length of magnetically decoupled superconducting conductors 20 to a length of magnetically coupled superconducting conductors to create a greater length of superconducting conductors. In such case, a length of magnetically coupled superconducting conductors may be any of partially to substantially completely magnetically coupled. One example of a splice 18 is that disclosed in JP Publication No. 2000090998, "Superconducting Cable Joint," published Mar. 31, 2000, to Sumitomo Electric Ind., Ltd., et al., the entire disclosure of each being incorporated by reference herein.

The terminations 26 may be one of an electrical connector, a thermal connector, and combinations thereof.

Figure 2:
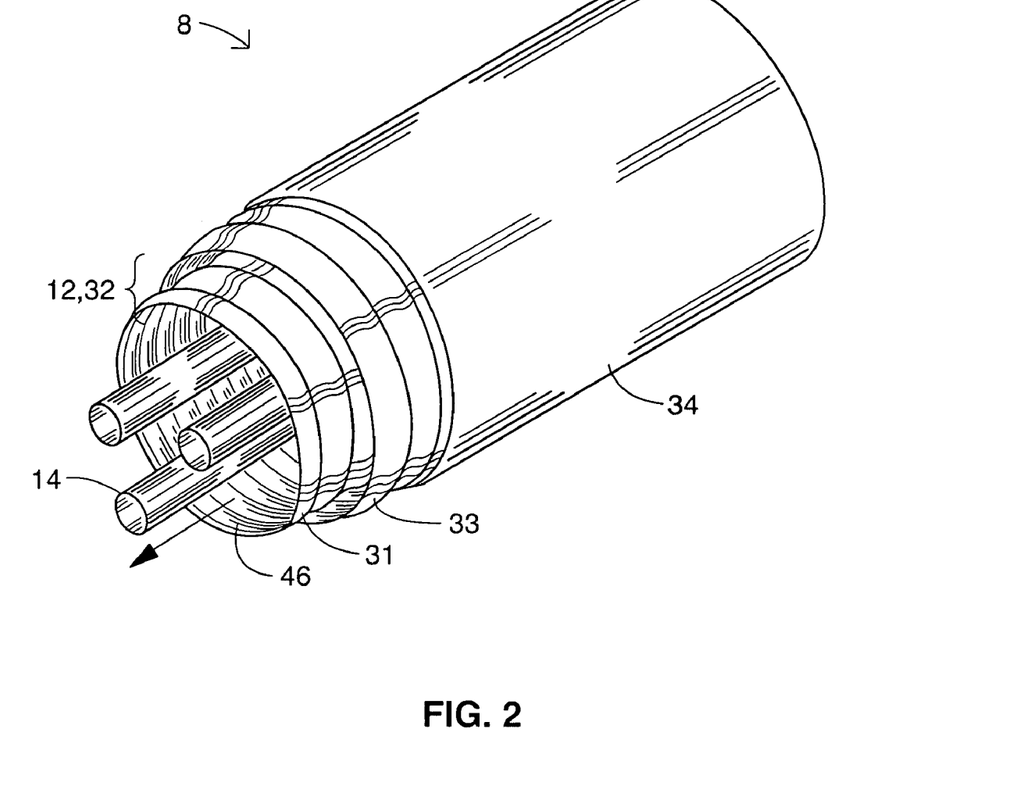
FIG. 2 is a schematic illustrating a superconducting cable useable in the system for transmitting current of FIG. 1.
Figure 3:
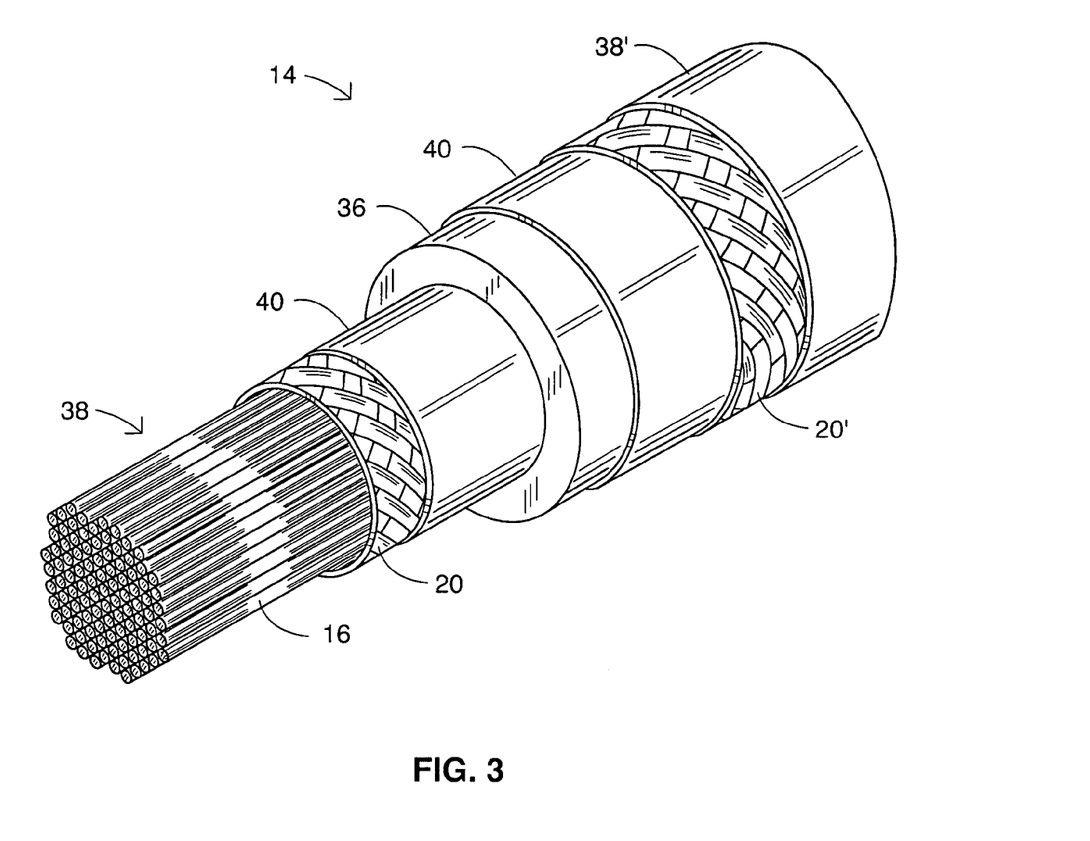
FIG. 3 is a schematic illustrating an electrical phase useable in the system for transmitting current of FIG. 1 and the cable of FIG. 2.

In the preferred embodiment, a plurality, typically three, of electrical phases 14 can be grouped together inside one cryostat 12 to form a cable 8, as shown in FIG. 2. In addition, the cable 8 may also include one or more of each of the following: thermal insulation 32, a protective jacket 34, and a cryogen path 46. Certainly the cable 8 includes at least one electrical phase 14 and may include a plurality of electrical phases 14. The plurality may be three, and at least two of the plurality of electrical phases include a mandrel 16 and braided magnetically decoupled superconducting conductors 20. For the purposes of this description, the phrase "electrical phase" is used to refer to a physical construction whose primary function is to carry electrical current at substantively one potential and substantively one frequency.

The cryostat 12 serves to maintain the thermal region of the cable 8 separately from the surrounding environment. A cryostat 12 typically includes an inner surface 31, a thermal insulation 32, and an outer surface 33. The inner surface 31 is preferably in contact with a portion of cryogen path 46. The outer surface 33 of cryostat 12 is preferably in contact with the surrounding environment. The at least one electrical phase 14 is either introduced into a cryostat 12, or a cryostat 12 is constructed over the construction.

A cryogen path 46 is capable of directing a fluid through the cryostat 12. The fluid may be a liquid, such as liquid nitrogen or liquid helium. Alternatively, the fluid may be a gas. The fluid thermally communicates between the refrigerator 28 and the cable 8, and may be any material or arrangement of materials that facilitates the operation of the cable 8 at a temperature at which the superconducting material exhibits its superconducting characteristics.

The thermal insulation 32 may be any material or arrangement of materials that facilitates the operation of the cable 8 at a temperature at which the superconducting material exhibits its superconducting characteristics, such are known in the art. One example of a thermal insulation 32 is vacuum-based insulation. Such vacuum-based insulation may be a structure capable of maintaining sub-atmospheric pressure preferably of no greater that about 0.5 milliTorr. Alternatively, the thermal insulation 32 may be a multi-layer insulation in a comparable vacuum.

The cryostat 12 has flexibility such that its electrical, physical, and mechanical properties do not substantially deteriorate upon bending upon a drum (to be stored and/or transported) or bending during the installation process. The cryostat 12 is preferably two concentric corrugated stainless steel tubes with a vacuum space between to form thermal insulation 32. However, the cryostat may be of any material or arrangement of materials that is compatible with the temperature at which the superconducting materials exhibits its superconducting characteristics, such are known in the art.

Alternatively, the outer surface of cryostat 12 may be covered with a protective jacket 34. The protective jacket 34 is made using a material that provides the cryostat 12 with the capability to be maneuvered into pre-existing conduits, while at the same time protecting the cryostat 12 from damage that would inhibit or prevent its operation. The protective jacket 34 may be a polymer, such as a polyvinyl chloride.

Referring to FIG. 3, the at least one electrical phase 14 consists of a mandrel 16 surrounded by at least one band of magnetically decoupled superconducting conductors 20, which may be covered with dielectric 36 (also sometimes called an electrically insulating material 36), which may be further covered with at least one additional band of magnetically decoupled superconducting conductors 20'. Preferably, a fault winding 38, 38' either underlies or overlies the band of magnetically decoupled superconducting conductors 20', and is connected electrically in parallel, at substantively the same electrical potential. In the preferred embodiment, the mandrel 16 acts as the fault winding 38 for the innermost band of magnetically decoupled superconducting conductors 20. Additionally, an electrostatic shield layer 40 may optionally underlie and/or overlie dielectric 36.

The mandrel 16 may be a flexible material. Preferably, single filament and multiple filament (e.g., plurality of filaments) pure metals or alloys, such as one of an aluminum alloy and a copper alloy, may be used as a mandrel 16. Alternatively, the mandrel 16 may be a corrugated tube. Alternatively the mandrel 16 may be a pipe having a spiral groove (hereinafter referred to as a spiral tube). A bellows tube having a bellows may also be employed as a mandrel 16. Further, the mandrel 16 can also be prepared from a spirally wound material such as a spiral steel strip. Each of these shapes is adapted to provide the mandrel 16 with sufficient flexibility. The flexible mandrel 16 provides the inventive cable 8 with flexibility.

Metallic materials, as well as non-metallic material, alone or in combination, may be used to construct the mandrel 16. Examples of metallic materials include stainless steel, copper, aluminum, and the like, while examples of non-metallic materials include polymers, ceramics, and combinations thereof. Reinforced polymer, such as a fiberglass-reinforced polymer, are contemplated. No matter the construction or the material, it is advantageous that the mandrel 16 be cryogenically compatible. It is also advantageous that the mandrel 16 have sufficient strength and flexibility at both operating and installation temperatures of the cable 8.

Preferably, the mandrel 16 consists of a plurality of filaments of low resistance metals such as copper or copper alloys sized to handle any fault current that might be expected for the given electrical phase. In this embodiment, the mandrel acts as the fault winding 38 for the innermost band of magnetically decoupled superconducting conductors 20. All filaments within a discrete fault winding 38 are electrically connected in parallel.

When a pipe, which optionally may have a spiral groove or a bellows tube, is employed as the mandrel 16, it may be drilled with holes of a size and pattern to allow the cryogen such as liquid helium (LHe) for low temperature superconducting (LTS) conductors or liquid nitrogen ($LN_2$) for HTS conductors to flow into the butt gaps of the magnetically decoupled superconducting conductors 20 and flood the dielectric 36 (also sometimes called an electrically insulating material 36). In this embodiment, the mandrel 16 provides a central, tube-like cryogen path 46 for transporting cryogen from the refrigeration system 28.

In one embodiment, mandrel 16 can further comprise a tape which is laid or wound on the mandrel 16. The tape can form a smooth surface for covering any grooves of the mandrel 16 so that the superconducting tapes do not buckle. It is possible to cover any grooves while maintaining flexibility of the mandrel 16 by laying the tape. The tape may consist of any material that is cryogenically compatible and that has sufficient strength and flexibility at both operating and installation temperatures of the cable 8.

In another embodiment, the flexible mandrel 16 may be optionally covered with a wire braid or mesh.

The mandrel 16 may have any one of a spiral groove surface, a web-shaped surface, a mat-shaped surface, and a braid-shaped surface on its exterior to form a surface for the construction of magnetically decoupled superconducting conductors 20.

In the cryostat 12, the mandrel 16 is adapted to hold the tape-shaped superconducting conductors 20 at a bending strain of a prescribed range. This mandrel 16 has a length that is required for the cryostat 12 and is provided substantially at the center of the cryostat 12. The mandrel 16 is in a substantially cylindrical or spiral shape so that the superconducting conductors 20 are laid thereon and generally has a substantially constant diameter along its overall length.

When practicing the present invention, it is possible to lay or wind several tape-shaped multi-filamentary superconducting conductors 20 on the mandrel 16. The superconducting conductors 20 may be braided in one or more layers while directing a surface thereof to the mandrel 16. Each layer may be formed by an arbitrary number of the superconducting conductors 20. When several superconducting conductors 20 are braided on the mandrel to create a layer of superconducting conductors 20, additional superconducting conductors 20 may be further braided thereon. When a sufficient number of superconducting conductors 20 are braided on the first layer of the superconducting conductors 20 as a second layer, a third layer of superconducting conductors 20 may then be braided thereon. No insulating layer is provided between each adjacent pair of layers. For the purposes of this description, the entirety of the adjacent pair of layers will be referred to as a band. All superconducting conductors within a discrete band are electrically connected in parallel.

The band of magnetically decoupled superconducting conductors 20 consists of a plurality of superconducting conductors braided on the flexible mandrel 16. The superconducting conductor may consist of any construction of conductor that contains a portion including any superconducting material. Applicable form factors are substantively round (typically called wire), substantively flat (typically called tape), or any form between. The superconducting material can be deposed in one portion (typically called monofilament), two portions, or a plurality of portions (typically called multifilament).

One type of superconducting material usable for making the superconductor conductor is a high temperature superconducting (HTS) material. One HTS material is a copper-based-HTS material. Examples of copper-based-HTS materials include $La_{2-x}M_xCuO_4$, $Ln_{2-x}Ce_xCuO_4$, $ReBa_2Cu_3O_{7-d}$, bismuth-strontium-calcium-copper-oxide family of superconductors Such as, for example, $Bi_2Sr_2CalCu_2O_x$, $(Bi,Pb)_2Sr_2CalCu_2O_x$, and $Bi_2Sr_2CaCu_3O_x$, $(Bi,Pb)_2Sr_2CaCu_3O_x$ ($Bi_2Sr_2CalCu_2O_x$, $(Bi,Pb)_2Sr_2CalCu_2O_x$, are often referred to as BSCCO 2212 and $Bi_2Sr_2CaCu_3O_x$, $(Bi,Pb)_2Sr_2CaCu_3O_x$ are often referred to as BSCCO 2223: all often referred to as BSCCO), and combinations thereof. In $La_{2-}$ $_x$M$_x$CuO$_4$, M may be one of Ca, Sr, Ba, and combinations thereof. In Ln$_{2-x}$Ce$_x$CuO$_4$, Ln may be one of Pr, Nd, Sm, Eu, Gd, and combinations thereof. In ReBa$_2$Cu$_3$O$_{7-d}$, Re may be one of Y, Pr, Nd, Sm, Eu, Gd, Dy, Ho, Er, Tm, Yb, and combinations thereof. A specific ReBa$_2$Cu$_3$O$_{7-d}$ is YBa$_2$Cu$_3$O$_{7-d}$ that is often referred to YBCO.

Examples of superconducting material usable may be any such as of those disclosed in any one of U.S. Pat. No. 6,601,289, "Manufacturing process of superconducting wire and retainer for heat treatment," issued Aug. 5, 2003, to Kobayashi; U.S. Pat. No. 6,495,765, "Superconductors," issued Dec. 17, 2002, to Riley, Jr.; U.S. Pat. No. 6,311,386, "Processing of (Bi,Pb) SCCO superconductor in wires and tapes," issued Nov. 6, 2001, to Li, et al.; U.S. Pat. No. 6,295,716, "Production and processing of (Bi,Pb) SCCO superconductors," issued Oct. 2, 2001, to Rupich, et al.; U.S. Pat. No. 5,942,466, "Processing of (Bi,Pb) SCCO superconductor in wires and tapes," issued Aug. 24, 1999, to Li, et al.; U.S. Pat. No. 5,968,877, "High Tc YBCO superconductor deposited on biaxially textured Ni substrate," issued Oct. 19, 1999, to Budai, et al.; U.S. Pat. No. 5,846,912, "Method for preparation of textured YBa2Cu3Ox superconductor," issued Dec. 8, 1998, to Selvamanickam, et al.; U.S. Pat. No. 6,638,894, "Devices and systems based on novel superconducting material," issued Oct. 28, 2003, to Batlogg, et al.; U.S. Pat. No. 6,251,530, "Thin-film of a high-temperature superconductor compound and method," issued Jun. 26, 2001, to Bozovic, et al.; U.S. Pat. No. 4,994,433, "Preparation of thin film superconducting oxides," issued Feb. 19, 1991, to Chiang; U.S. Pat. No. 6,194,352, "Multifilament composite BSCCO oxide superconductor," issued Feb. 27, 2001, to Riley, Jr., et al.; U.S. Pat. No. 6,069,116, "Method of forming BSCCO superconducting composite articles," issued May 30, 2000, to Li, et al.; U.S. Pat. No. 5,661,114, "Process of annealing BSCCO-2223 superconductors," issued Aug. 26, 1997, to Otto, et al.; U.S. Pat. No. 5,661,114, "Process of annealing BSCCO-2223 superconductors," issued Aug. 26, 1997, to Otto, et al.; and U.S. Pat. No. 5,635,456, "Processing for Bi/Sr/Ca/Cu/O-2223 superconductors," issued U.S. Pat. No. 5,635,456, to Riley, Jr., et al.; the entire disclosure of each being incorporated by reference herein.

One example of superconducting conductor is the type having an oxide superconductor and a stabilizing metal covering the same, also known as first generation superconducting conductor. Included in the first generation superconducting conductor is a tape-shaped multi-filamentary oxide superconducting wire having such a structure that is a number of filaments consisting essentially of an oxide superconductor contained in a stabilizing material of silver, silver alloys, nickel, and nickel alloys. The oxide superconductor may be prepared from an oxide superconductor such as bismuth, strontium, calcium, and copper oxide.

Another example of superconducting conductor is the type having a coating of an oxide superconductor on a metallic tape substrate, the oxide superconductor in turn optionally coated by a stabilizing metal. This construction is also known as second generation superconducting conductor. Preferably, the stabilizing metal and the substrate used in the present invention are individually selected from the group consisting of silver, silver alloys, and nickel and nickel alloys, which may require a buffer layer.

Another type of superconducting material usable for making the superconductor conductor is a low temperature superconducting (LTS) material. One LTS material is a niobium-based alloy. Examples of niobium-based alloys include those with one of titanium, tin, aluminum, and combinations thereof. These niobium-based alloys may further include one of tantalum, zirconium, tin, and combinations thereof. One group of LTS niobium-based alloys is a niobium-titanium-based alloy such as those including between about 45 to about 50 weight percent titanium. Another group of LTS niobium-based alloys includes an Al5 superconducting phase. Such niobium-based alloys may includes one of tin, aluminum, and combinations thereof. Specific examples of LTS niobium-based alloys include Nb$_3$Sn and Nb$_3$Al.

Yet another type of superconducting material usable for making the superconductor conductor is a magnesium boride such as, for example, MgB$_2$. Examples of magnesium boride superconducting material usable may be any such as of those disclosed in any one of U.S. Pat. No. 6,511,943, "Synthesis of magnesium diboride by magnesium vapor infiltration process (MVIP)," issued Jan. 28, 2003, to Serquis, et al.; U.S. Patent Publication No. U.S. 2002/0127437 A1, "MgB$_2$ superconductors," published on Sep. 12, 2002, for Sang-Wook Cheong; et al.; U.S. Patent Publication No. U.S. 2002/0198111 A1, "Method for manufacturing MgB$_2$ intermetallic superconductor wires," published on Dec. 26, 2002, for Michael J. Tomsic; and U.S. Patent Publication No. U.S. 2004/0009879 A1, "Method for the production of superconductive wires based on hollow filaments made of MgB$_2$," published on Jan. 15, 2004, for Giovanni Giunchi, et al., the entire disclosure of each being incorporated by reference herein.

The superconductor conductor useable in the present invention may include a substrate that facilitates the creation of a superconductor material having a length that makes practical its use, while at the same time facilitates a braiding of the superconductor about a mandrel 16. For example, the substrate may be a metal substrate, such as one having a thickness of between about 25 and about 127 micrometers. (25.4 micrometers is equal to 1 Mil.) If, for example, the superconductor material is YBCO, then its thickness may be between about 1 to about 5 micrometers.

Since the YBCO on its alloy substrate is both stronger and thinner than the BSCCO, it allows for many new winding schemes. One such is braiding the conductors over the surface of the mandrel 16. Superconducting conductors 20, whether in the form of a wire (or individual tapes in the case of a power cable), are said to be decoupled when there is substantially no net magnetic field enclosed between any pair of superconducting conductors 20. This state can be achieved by transposing the superconducting conductors 20 as they are wound on a mandrel 16. Transposition may be achieved when every superconducting conductors 20 is at some proportion of the time in each of the possible magnetic fields. Wilson teaches in Superconducting magnets (published by Clarendon Press, Oxford, 1983) at page 197 that "a simple twisted cable in which the inner wires always remain inside and the outer wires remain outside would behave just like a large twisted composite and would suffer large self-field loss. Full transposition avoids this by ensuring that no net self-field flux is enclosed between the strands."

A purpose of the braided magnetically decoupled superconducting conductors 20 is to reduce AC losses. To that end, the braided magnetically decoupled superconducting conductors 20 include a first number of superconducting conductors in a first direction about the mandrel 16 and substantially the same number of superconducting conductors in a second direction about the mandrel 16. The braided magnetically decoupled superconducting conductors 20 may be formed in a weave pattern of over one, under one. Likewise, the braided magnetically decoupled superconducting conductors 20 may be formed in a weave pattern of over two, under two. That is, any weave pattern that creates a structure from the superconducting conductors 20 that produces a magnetically decoupled arrangement is an appropriate weave pattern. For example, weave pattern may be a biaxial braid forming a braid angle, α, with respect to the axis of braiding (α is an acute angle measured with respect to the longitudinal axis). In a best case, the AC loss can be reduced by a factor of the square root of the number of tapes. In one example, the individual tapes are insulated to prevent them from making incidental electrical contact with each other.

Advantageously, the superconducting conductors 20 are braided on the mandrel 16 to create a magnetically decoupled arrangement. The superconducting conductors 20 are braided at a lay angle of up to about 90 degrees, advantageously from about 10 to about 60 degrees, and preferably from about 20 to about 40 degrees. Braids like this are typical on outside of cryogen transfer hoses, where they are wound from many parallel thin wires. Therefore, the technology to create such a braid already exists.

Tension on the superconducting conductors during the braiding process, including the resting state of the final construction, are limited so as not to cause a decrease in critical current of the superconducting conductor of greater than 25%. This tension limit is dependant on the type, thickness, and construction of the particular superconducting conductor.

According to the present invention, each superconducting conductor 20 is braided on a mandrel 16 having a prescribed diameter at a bending strain or a curvature of a prescribed range and a pitch of a prescribed range. A relatively loose bending is applied to the superconducting conductor 20 along its longitudinal direction. The superconducting conductor 20 that is braided on the mandrel 16 is bent at a bending strain limited so as not to cause a decrease in critical current of the superconducting conductor of greater than about 25%. This bending strain limit is dependant on the type, thickness, and construction of the particular superconducting conductor.

YBCO has a much higher current density than BSCCO, which means that fewer tapes are needed to carry the operating current of the cable. Present cable designs rely on full coverage of the surface of the core to create a low loss cable winding. That can result in using extra YBCO tapes to cover the surface that are not necessary to carry the current. This will increase the cost of the cable. The braiding concept does not rely on full surface coverage and can use substantially less tapes in some instances, particularly in bands with greater winding diameters.

Returning to FIG. 3, one embodiment of the present invention includes an electrical phase 14 having at least two distinct groups of superconducting conductors 20, 20'. Advantageously, a layer of dielectric 36 (also sometimes called an electrically insulating material 36) separates each of the at least two distinct groups of magnetically decoupled superconducting conductors 20, 20'. In one embodiment of the present invention, the at least two distinct groups of magnetically decoupled superconducting conductors 20, 20' carry approximately equal amounts of the current flowing through the cable.

Also advantageous is where the band of magnetically decoupled superconducting conductors 20 furthest from the mandrel 16 provides shielding of the current flowing through the other bands, creating a coaxial construction. This coaxial construction forces the magnetic field to stay substantially between the inner band of magnetically decoupled superconducting conductors 20 and the outer band of magnetically decoupled superconducting conductors 20'. There is substantially no magnetic field outside the magnetically decoupled superconducting conductors 20', and therefore, there are no eddy current losses in the outer metallic enclosures or optional fault winding 38'. There is also substantially no magnetic field inside the magnetically decoupled superconducting conductors 20, 20', and therefore, there are no eddy current losses in the mandrel or optional fault winding 38.

Additionally, the coaxial construction forces the magnetic field to be substantially circumferential; thereby the local magnetic field is substantially parallel to the surface of the superconducting conductor 20. In some superconducting conductors, this parallel field orientation has better performance for a given magnitude of magnetic field. With this construction very large amounts of current can be carried depending upon the number and critical current of magnetically decoupled superconducting conductors 20.

A fault winding 38 can lie between mandrel 16 and magnetically decoupled superconductors 20. Additionally, a fault winding 38' can overlie magnetically decoupled superconductors 20'. The optional fault winding 38' is at the same electrical potential as the magnetically decoupled superconducting conductors 20; and the optional fault winding 38' is at the same electrical potential as the magnetically decoupled superconducting conductors 20'. The fault winding 38 include a plurality of filaments or tapes of low resistance metals such as copper or copper alloys sized to handle any fault current that might be expected for the given electrical phase. All filaments within a discrete fault winding 38 are electrically connected in parallel.

Additionally, an electrostatic shield layer 40 may optionally underlie and overlie dielectric 36. Advantageously, the outermost band of magnetically decoupled superconductors 20 or fault winding 38 might be surrounded by a binder tape. The binder tape serves to hold the windings in a generally concentric position. Binder tape can be any material or combination of material that can meet the physical, mechanical, and thermal requirements. Preferably, it can be the same material as the dielectric 36.

In some embodiments, the outermost band of magnetically decoupled superconducting conductors can be maintained at substantively ground potential to serve as an electrical as well as magnetic shield for the electrical phase 14. The present invention includes both shielded and unshielded electrical phases 14.

In an embodiment, the dielectric 36 (also sometimes called an electrically insulating material 36) remains at the cryogenic temperature, and any material that can withstand the cryogenic temperature without any physical and mechanical degradation would be suitable. The polymeric dielectric material of one aspect of the present invention has good physical and mechanical properties at liquid nitrogen and lower temperatures. It has high dielectric strength and high breakdown voltage. Also, it is desirable that the electrical insulating material 36 be cryogenically compatible material.

The at least one dielectric 36 (also sometimes called an electrically insulating material 36) may be capable of withstanding typical rated Basic Impulse Insulation Level (BIL) voltage levels for a given operating voltage, as are known in the art.

The dielectric 36 (also sometimes called an electrically insulating material 36) may be any one of a polypropylene, Kraft paper, polypropylene laminated paper (typically called PPLP), polyimide, polyamide, polyethylene, cross-linked polyethylene (typically called XLPE) or EPR; or any material or combination of material that can meet the physical, mechanical, electrical and thermal requirements.

The dielectric may be extruded or wound out of a plurality of tapes, extruded directly, or any method known in the art.

Advantageously, an electrostatic shield layer 40 underlies and overlies the dielectric 36. The electrostatic shield layer serves to smooth out the electric field profile of the metallic elements of the cable (such as a layer of magnetically decoupled superconducting conductors 20). Concerning an appropriate material for at least one electrostatic shield layer 40, it is any that is capable of shaping an electrical field, whether used alone or in combination with other materials. To that end, the at least one electrostatic shield layer 40 may be any one of a conducting material, a semiconducting material, and combinations thereof. The plurality of electrostatic shields is a number that provides a structure appropriate for shaping an electrical field. Such number appears to be about two per layer of dielectric 36.

The following is a comparison of the calculated losses for an about 34.5 kV cable in the configuration of the preferred embodiment, with about 4 mm-wide, about 2-micron thick YBCO on an about 2 mil substrate, with critical current density on the order of $1.5 \times 10^{10}$ A/m$^2$. Braiding reduces losses more dramatically for higher operating currents, as shown in Table 1. The comparison assumes a standard cable of a filamentary mandrel style design where the mandrel consists of copper to carry the fault current. Greater levels of the fault current correspond to larger mandrel diameters. The diameters shown are three-phase cable outer diameters, in inches. These numbers are given for approximate reference, since the real limitation on diameter is the voltage insulation, which is not covered here. The loss reduction is relatively constant for all typical fault current levels, and therefore for a large range of mandrel diameters. Losses in the superconductors in the braided construction are effectively constant for all voltages.

TABLE 1

Ratio of standard losses to braided losses vs fault current kA

| Fault current (kA) | Cable OD in (cm) | Operating current ($A_{rms}$) | | | | | | |
|---|---|---|---|---|---|---|---|---|
| | | 500 | 800 | 1000 | 1250 | 1500 | 1750 | 2000 |
| 10 | 2.2 (5.6) | 1.8 | 2.9 | 3.2 | 3.1 | 3.3 | 3.2 | 3.4 |
| 20 | 2.2 (5.6) | 1.4 | 2.1 | 2.6 | 3.1 | 3.3 | 3.2 | 3.4 |
| 30 | 2.4 (6.1) | 1.1 | 1.7 | 2.1 | 2.7 | 3.2 | 3.2 | 3.4 |
| 40 | 2.6 (6.6) | 1.0 | 1.6 | 1.9 | 2.4 | 2.8 | 3.2 | 3.4 |
| 50 | 2.7 (6.8) | 0.9 | 1.4 | 1.7 | 2.1 | 2.5 | 3.0 | 3.4 |

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention. By way of example, A plurality of cryostats 12, each with preferably one electrical phase 14, can be grouped together to form a cable 8. The electrical phase 14 contains at least one band of braided magnetically decoupled superconductors 20. The dielectric 36 (also sometimes called an electrically insulating material 36) can be external to the cryostat 12 in this construction. Typically this construction does not have a band of superconductors 20' acting as a shield. This embodiment may also contain one or more of the following: a fault winding 38, an electrostatic shield layer 40, thermal insulation 32, a protective jacket 34 and a cryogen path 46, and is typically called warm dielectric superconducting cable.

Figure 4:
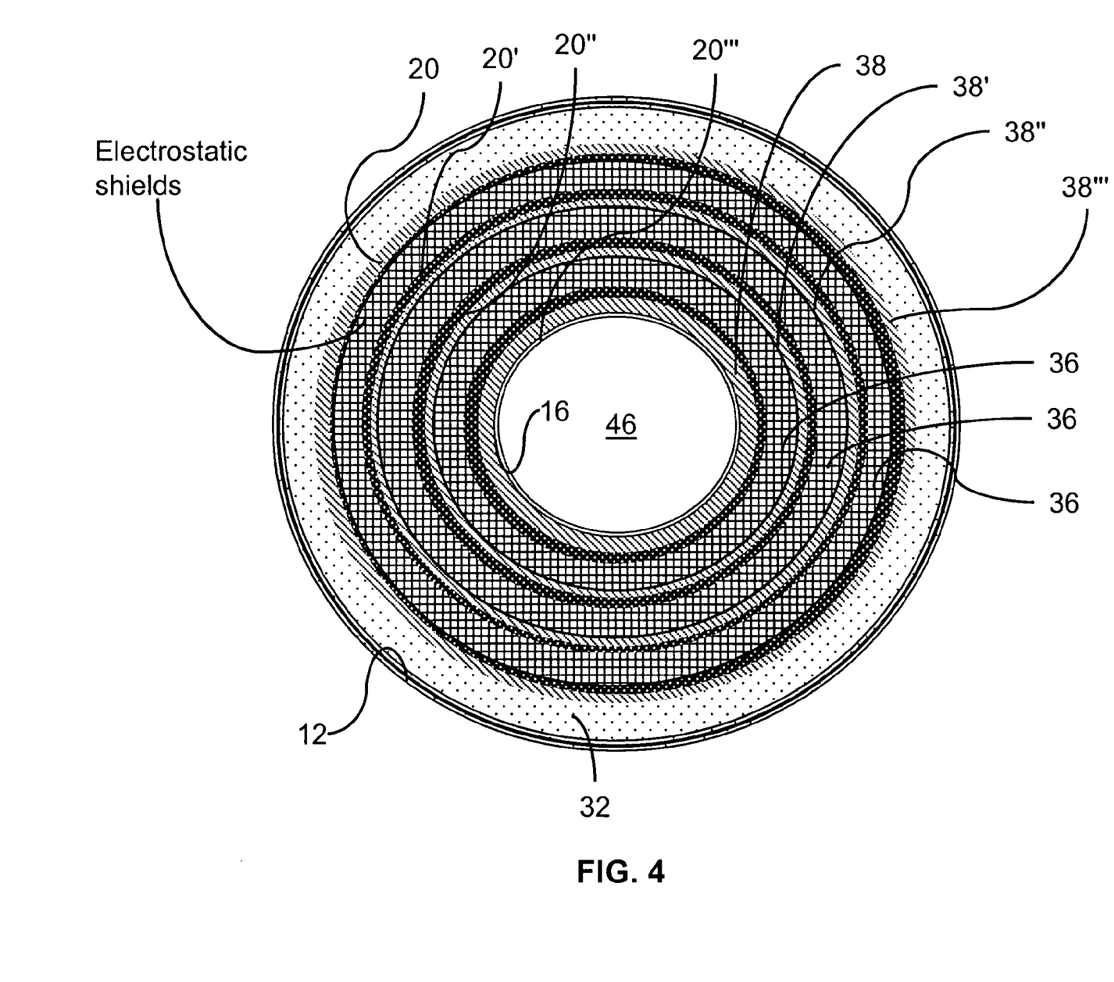
FIG. 4 is a cross-sectional schematic illustrating an alternative superconducting cable useable in the system for transmitting current of FIG. 1.

Alternatively, FIG. 4 illustrates another embodiment of the present invention includes at least three, preferably four, distinct bands of braided magnetically decoupled superconducting conductors 20, 20', 20'', 20''' wound concentrically on one mandrel 16 (typically called a tri-axial construction). Advantageously, a layer of dielectric 36 (also sometimes called an electrically insulating material 36) separates each of the distinct bands of superconducting conductors 20. Each band of magnetically decoupled superconducting conductors 20 may be a separate electrical phase or shield. This embodiment may also contain one or more of the following: a fault winding 38, 38', 38'', and 38''', an electrostatic shield layer 40, a cryostat 12, thermal insulation 32, a protective jacket 34 and a cryogen path 46.

Alternatively, a plurality of tri-axial constructions may be contained within one cryostat 12. This embodiment may also contain one or more of the following: a fault winding 38, an electrostatic shield layer 40, a cryostat 12, thermal insulation 32, a protective jacket 34 and a cryogen path 46.

The invention claimed is:

1. A superconducting cable useable in a system for transmitting current including at least one generator having at least one phase and at least one load, the cable comprising at least one cryostat containing at least one electrical phase including:
   a. a mandrel; and
   b. at least one superconductor layer deposed on the mandrel, the at least one superconductor layer including a plurality of braided magnetically decoupled superconducting conductors.

2. The cable according to claim 1 wherein the mandrel comprises a flexible material.

3. The cable according to claim 2 wherein the flexible material comprises one of an aluminum alloy and a copper alloy.

4. The cable according to claim 3 wherein the one of the aluminum alloy and a copper alloy comprises a single filament.

5. The cable according to claim 3 wherein the one of the aluminum alloy and a copper alloy comprises a plurality of filaments.

6. The cable according to claim 1 wherein the mandrel comprises a corrugated tube.

7. The cable according to claim 6 wherein the corrugated tube comprises a metallic material.

8. The cable according to claim 7 wherein the metallic material comprises a stainless steel.

9. The cable according to claim 6 wherein the corrugated tube comprises a non-metallic material.

10. The cable according to claim 9 wherein the non-metallic material comprises a polymer.

11. The cable according to claim 10 wherein the polymer is a reinforced polymer.

12. The cable according to claim 11 wherein the reinforced polymer is a fiberglass-reinforced polymer.

13. The cable according to claim 1 wherein the mandrel is cryogenically compatible.

14. The cable according to claim 1 wherein the braided magnetically decoupled superconducting conductors reduce AC losses.

15. The cable according to claim 1 wherein a first number of superconducting conductors in a first direction about the mandrel is substantially the same as a second number of superconducting conductors in a second direction about the mandrel.

16. The cable according to claim 1 wherein the braid comprises a weave pattern of over one, under one.

17. The cable according to claim 1 wherein the braid comprises a weave pattern of over two, under two.

18. The cable according to claim 1 wherein the braid comprises a biaxial braid (e.g., a braid angle, a, is an acute angle measured with respect to the axis of braiding (longitudinal axis).

19. The cable according to claim 1 wherein the superconductor is a high temperature superconductor (HTS) conductor.

20. The cable according to claim 1 wherein the HTS conductor comprises a copper-based-HTS conductor.

21. The cable according to claim 1 wherein the copper-based-HTS conductor comprises one of $La_{2-x}M_xCuO_4$, $Ln_{2-x}Ce_xCuO_4$, $ReBa_2Cu_3O_{7-d}$, $Bi_2Sr_2CalCu_2O_x$, $(Bi,Pb)_2Sr_2CalCu_2O_x$, $Bi_2Sr_2CaCu_3O_x$, $(Bi,Pb)_2Sr_2CaCu_3O_x$, and combinations thereof.

22. The cable according to claim 21 wherein the copper-based-HTS conductor comprises $YBa_2Cu_3O_{7-d}$ (YBCO).

23. The cable according to claim 1 wherein the copper-based-HTS conductor comprises $La_{2-x}M_xCuO_4$ and M comprises one of Ca, Sr, Ba, and combinations thereof.

24. The cable according to claim 1 wherein the copper-based-HTS conductor comprises $Ln_{2-x}Ce_xCuO_4$, and Ln comprises one of Pr, Nd, Sm, Eu, Gd, and combinations thereof.

25. The cable according to claim 1 wherein the copper-based-HTS conductor comprises $ReBa_2Cu_3O_{7-d}$, and Re comprises one of Y, Pr, Nd, Sm, Eu, Gd, Dy, Ho, Er, Tm, Yb, and combinations thereof.

26. The cable according to claim 1 wherein the superconductor conductor comprises a metal substrate.

27. The cable according to claim 26 wherein the metal substrate has a thickness of between about 25 and about 127 micrometers.

28. The cable according to claim 27 wherein the superconductor conductor comprises YBCO having a thickness between about 1 to about 5 micrometers.

29. The cable according to claim 1 wherein the superconductor conductor comprises a magnesium boride.

30. The cable according to claim 29 wherein the magnesium boride comprises $MgB_2$.

31. The cable according to claim 1 further including a thermal insulation.

32. The cable according to claim 31 wherein the thermal insulation comprises a vacuum-based insulation.

33. The cable according to claim 31 wherein the thermal insulation comprises a multiple-layer insulation.

34. The cable according to claim 33 wherein the multiple-layer insulation comprises superinsulation.

35. The cable according to claim 1 further including a protective jacket.

36. The cable according to claim 35 wherein the protective jacket comprises a polymer.

37. The cable according to claim 36 wherein the polymer comprises a polyvinyl chloride.

38. The cable according to claim 1 further including at least one electrically insulating material.

39. The cable according to claim 38 wherein at least one electrical insulating material comprises a plurality of the electrically insulating materials.

40. The cable according to claim 39 wherein the plurality of electrically insulating materials comprise at least about 4.

41. The cable according to claim 38 wherein the electrical insulating material comprises a cryogenically compatible material.

42. The cable according to claim 38 wherein at least one electrical insulating material comprises an extrusion.

43. The cable according to claim 1 further including at least one electrostatic shield.

44. The cable according to claim 43 wherein the at least one electrostatic shield comprise a conducting material.

45. The cable according to claim 43 wherein at least one electrostatic shield comprise a semiconducting material.

46. The cable according to claim 43 wherein at least one electrostatic shield is capable of shaping an electrical field.

47. The cable according to claim 43 wherein at least one electrostatic shield comprises a plurality of electrostatic shields.

48. The cable according to claim 47 wherein the plurality of electrostatic shields are on either side of an electrical insulation.

49. The cable according to claim 47 wherein the plurality of electrostatic shields comprises about two per each at least one electrically insulating material layer.

50. The cable according to claim 1 further including at least one spacer.

51. The cable according to claim 50 wherein the at least one spacer comprises a non-electrically conductive material.

52. The cable according to claim 50 wherein the at least one spacer comprises a cryogenically compatible material.

53. The cable according to claim 1 wherein at least one electrical phase comprise a plurality of electrical phases.

54. The cable according to claim 53 wherein at least two of the plurality of electrical phases include:
  a. a mandrel; and
  b. braided magnetically decoupled superconducting conductors.

55. The cable according to claim 53 wherein the plurality of electrical phases comprises at least about two electrical phases.

56. The cable according to claim 1 further including a cryogen path.

57. The cable according to claim 56 wherein the cryogen path is capable of directing a fluid.

58. The cable according to claim 57 wherein the fluid is a liquid.

59. The cable according to claim 58 wherein the liquid is liquid nitrogen.

60. The cable according to claim 57 wherein the fluid is a gas.

61. A superconducting cable useable in a system for transmitting current including at least one generator having at least one phase and at least one load, the cable comprising at least one cryostat containing at least one electrical phase including:
  a mandrel; and
  braided magnetically decoupled superconducting conductors deposed on the mandrel,
  wherein the superconductor conductor comprises a low temperature superconductor (LTS) conductor.

62. The cable according to claim 61 wherein the LTS conductor comprises a niobium-based alloy.

63. The cable according to claim 62 wherein the niobium-based alloy comprises an A15 superconducting phase.

64. The cable according to claim 62 wherein the niobium-based alloy includes one of titanium, tin, aluminum, and combinations thereof.

65. The cable according to claim 64 wherein the niobium-based alloy comprises a niobium-titanium-based alloy.

66. The cable according to claim 65 wherein the niobium-titanium-based alloy comprises between about 45 to about 50 weight percent titanium.

67. The cable according to claim 64 wherein the niobium-based alloy comprises an A15 superconducting phase.

68. The cable according to claim 62 wherein the niobium-based alloy includes one of titanium, tin, aluminum, and combinations thereof, and one of tantalum, zirconium, tin, and combinations thereof.

69. The cable according to claim 68 wherein the niobium-based alloy comprises an A15 superconducting phase.

70. The cable according to claim 69 wherein the niobium-based alloy comprises one of $Nb_3Sn$ and $Nb_3Al$.

71. The cable according to claim 70 wherein the $Nb_3Sn$ comprises between about 18 to about 25 weight percent tin.

72. A system for transmitting current comprising:
   a. at least one generator having at least one phase;
   b. at least one superconducting cable having at least one cryostat containing at least one electrical phase including at least one mandrel and at least one superconductor layer deposed on the at least one mandrel, the at least one superconductor layer including a plurality of braided magnetically decoupled superconducting conductors;
   c. terminations; and
   d. at least one load.

73. A system for transmitting current comprising:
   a. at least one generator having at least one phase;
   b. at least one superconducting cable having at least one cryostat containing at least one electrical phase including at least one mandrel and at least one superconductor layer deposed on the at least one mandrel, the at least one superconductor layer including a plurality of braided magnetically decoupled superconducting conductors;
   c. at least one refrigeration system; and
   d. at least one load.

74. The system for transmitting current according to claim 73 further including terminations.

75. The system for transmitting current according to claim 74 wherein the terminations include an electrical connector.

76. The system for transmitting current according to claim 74 wherein the terminations include a thermal connector.

77. The system for transmitting current according to claim 73 wherein the refrigeration system is a refrigerator.

78. The system for transmitting current according to claim 73 wherein the refrigeration system includes a mechanism for circulating cryogen through the cryostat.

79. A method for manufacturing a system for transmitting current, said method comprising the steps of:
   a. providing at least one generator having at least one phase;
   b. at least one load; and
   c. providing at least one superconducting cable having at least one cryostat containing at least one electrical phase including at least one mandrel and at least one superconductor layer deposed on the at least one mandrel to transmit current over at least a portion of a distance between said at least one generator and said at least one load, the at least one superconductor layer including a plurality of braided magnetically decoupled superconducting conductors.

80. A method for manufacturing a cryostat useable in a system for transmitting current, said method comprising the steps of:
   a. providing a mandrel; and
   b. braiding a plurality of superconducting conductors in a superconductor layer on said mandrel so that the superconductor conductor are substantially magnetically decoupled.

81. A cable useable in useable in a system for transmitting current, said cable comprising:
   a. at least one mandrel; and
   b. a plurality of superconducting conductors braided in a superconductor layer on said at least one mandrel so as to magnetically decouple said superconducting conductors.

* * * * *